(12) United States Patent
Gatti et al.

(10) Patent No.: US 8,167,152 B1
(45) Date of Patent: May 1, 2012

(54) VARIABLE HEIGHT AND ANGLE PANEL MOUNTING SYSTEMS, METHODS, AND APPARATUS

(75) Inventors: William Gatti, Sandy, UT (US); Michael Damen, Lille (FR); Venugopal R. Ghatikar, Salt Lake City, UT (US); Guillaume Martin, Villecresnes (FR)

(73) Assignee: 3form, Inc., Salt Lake City, UT (US)

( * ) Notice: Subject to any disclaimer, the term of this patent is extended or adjusted under 35 U.S.C. 154(b) by 702 days.

(21) Appl. No.: 12/028,584

(22) Filed: Feb. 8, 2008

Related U.S. Application Data

(60) Provisional application No. 60/888,821, filed on Feb. 8, 2007.

(51) Int. Cl.
*A47B 57/00* (2006.01)
(52) U.S. Cl. ........................................... 211/187
(58) Field of Classification Search .............. 211/187, 211/189, 192, 196, 86.01; 160/351, 135
See application file for complete search history.

(56) References Cited

U.S. PATENT DOCUMENTS

| | | | | | |
|---|---|---|---|---|---|
| 1,382,505 | A | * | 6/1921 | Hargey | 248/200.1 |
| 2,903,227 | A | * | 9/1959 | De Kalb Key | 248/200.1 |
| 3,221,678 | A | * | 12/1965 | Doherty | 248/230.1 |
| 3,762,116 | A | * | 10/1973 | Anderson et al. | 52/239 |
| 3,771,466 | A | * | 11/1973 | Ferdinand et al. | 108/109 |
| 4,145,849 | A | * | 3/1979 | Shindoll et al. | 211/119.003 |
| 4,188,758 | A | * | 2/1980 | Swann | 52/241 |
| 4,516,619 | A | * | 5/1985 | Hasbrouck | 160/135 |
| 4,819,817 | A | * | 4/1989 | Mar | 211/205 |
| 5,095,862 | A | * | 3/1992 | Murphy | 123/90.61 |
| 5,139,160 | A | * | 8/1992 | Romano | 211/44 |
| 5,148,928 | A | * | 9/1992 | Arnold | 211/187 |
| 5,558,501 | A | * | 9/1996 | Wang et al. | 416/244 R |
| 5,826,847 | A | * | 10/1998 | Warner et al. | 248/354.1 |
| 5,924,469 | A | * | 7/1999 | Whittemore | 160/368.1 |
| 6,241,108 | B1 | * | 6/2001 | Nakatani et al. | 211/187 |
| 6,443,319 | B1 | * | 9/2002 | Sander | 211/187 |
| 6,688,238 | B1 | * | 2/2004 | Alexiou | 108/42 |
| 7,165,690 | B2 | * | 1/2007 | Wu | 211/192 |
| 7,293,667 | B2 | * | 11/2007 | Flynn | 211/189 |
| 2004/0173551 | A1 | * | 9/2004 | Wu | 211/187 |
| 2004/0226903 | A1 | * | 11/2004 | Wang | 211/187 |

OTHER PUBLICATIONS

Fluowall Online Brochure, Author Unknown, Guardamiglio, Italy [online] [retrieved on Mar. 25, 2008], 12 pgs. Retrieved from the Internet URL: http://www.fluowall.it/fluowall.html.
Sorbetti Online Display Brochure, Author Unknown, [online] [retrieved on Mar. 25, 2008], 45 pgs. Retrieved from the Internet URL: http://www.bnind.com/sorbetti.asp.
Sorbetti Online Tech Specs, Author Unknown, [online] [retrieved on Mar. 25, 2008], 12 pgs. Retrieved from the Internet URL: http://www.bnind.com/downloads/pdfs/BN_Sorbetti_TechSpecs.pdf.

* cited by examiner

*Primary Examiner* — Sarah Purol
(74) *Attorney, Agent, or Firm* — Workman Nydegger

(57) ABSTRACT

A variable angle panel mounting system can include at least one variable-angle panel mounting member, which in turn includes an elongate support member and an angularly-adjustable mounting plate adapted to secure an end of the elongate support member to a plurality of mounting surface angles. In some embodiments, the variable angle panel mounting system may also include a pressure-fit mounting system. These components can provide the ability to angularly and vertically adjust the variable-angle panel mounting member between opposing support surfaces.

15 Claims, 7 Drawing Sheets

VARIABLE HEIGHT AND ANGLE PANEL MOUNTING SYSTEMS, METHODS, AND APPARATUS

CROSS-REFERENCE TO RELATED APPLICATIONS

This present invention claims the benefit of priority to U.S. Provisional Application No. 60/888,821, filed on Feb. 8, 2007, entitled "Modular Panel Mounting Systems and Apparatus." The entire content of the above-mentioned provisional application is incorporated by reference herein.

BACKGROUND OF THE INVENTION

1. The Field of the Invention

This invention relates to systems, methods, and apparatus for mounting and/or displaying panel structures as partitions, displays, barriers, or treatments.

2. Background and Relevant Art

Some recent architectural designs have implemented synthetic, polymeric resins, which can be used as partitions, displays, barriers, or treatments etc. Present polymeric resin materials generally used for creating these resin panels comprise polyvinyl chloride or "PVC"; polyacrylate materials such as acrylic, and poly (methylmethacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol) or "PETG"; glycol modified polycyclohexylenedimethlene terephthalate; or "PCTG"; as well as polycarbonate materials.

In general, resin materials such as these are now popular compared with decorative cast or laminated glass materials, since resin materials can be manufactured to be more resilient and to have a similar transparent, translucent, or colored appearance as cast or laminated glass, but with less cost. Decorative resins can also provide more flexibility compared with glass at least in terms of color, degree of texture, gauge, and impact resistance. Furthermore, decorative resins have a fairly wide utility since they can be formed to include a large variety of artistic colors, images, and shapes.

As mentioned above, one particular use of decorative resins can be in the panel form, where the panel might be used in conjunction with a panel mounting system as part of a partition, display, barrier, or treatment. One conventional type of panel mounting system includes a pair of standards or upright posts with one or more panels mounted therebetween. For example, a manufacturer then uses bracket-like elements to secure each panel between the pair of upright posts, such as using one or more bracket elements joined to the standards or uprights mounted to the panel by fastening elements. The manufacturer further secures these uprights posts to the floor, ceiling and/or a wall via one or more opposing rigid mounting plates.

Unfortunately, conventional panel mounting systems such as these tend to suffer from a number of drawbacks. In particular, these types of conventional mounting systems generally tend not to provide much flexibility in terms of mounting style or arrangement since they can be erected in only a limited number of configurations, and typically require complicated hardware and installation processes. Specifically, conventional mounting systems tend to either come only in standard sizes, or come in specifically "made to order" configurations that have limited use. One will appreciate that such limitations can be particularly problematic when panels are used in temporary settings, such as trade shows.

Additionally, because conventional panel mounting systems require complicated hardware and installation processes they are not readily assembled and disassembled. For example, conventional panel mounting systems often need to be secured to standard mounting surfaces that are substantially-vertical and substantially horizontal surfaces at 90° angles, such as vertical walls and/or horizontal floors and ceilings. Without specialized designs, however, such mounting systems may be ill-suited for use on surfaces that may be arched, curved, or angled. When conventional uprights are mounted to non-standard mounting surfaces the uprights are often misaligned, making suspension of a panel therebetween impossible or at the very least requiring expensive and time taking modifications and complicated installation procedures.

Along similar lines, another drawback of conventional panel mounting systems is that they tend to employ very little (or no) vertical adjustability. This enhances the need for manufacturers to be well aware of all possible floor-to-ceiling dimensions, and any variations thereto, when preparing a structure for a particular design space. Such information about dimensions in a new space, however, can be often difficult to come by with great specificity, particularly where a large amount of space needs to be considered. Furthermore, in the event there are any inaccuracies, or mismatches, it can be fairly expensive to retool and manufacture new mounting apparatus for that space.

Accordingly, there are a number of disadvantages in panel mounting systems that can be addressed.

BRIEF SUMMARY OF THE INVENTION

Implementations of the present invention provide systems, methods, and apparatus for mounting panels as partitions, displays, barriers, or treatments with a great deal of versatility, almost regardless of the dimensions of any given design space. In particular, implementations of the present invention provide mounting apparatus that can be used in a wide variety of configurations, and secured to a wide variety of surfaces including non-standard mounting surfaces. In one implementation, for example, implementations of the present invention include panel mounting systems and components that are angularly and/or vertically-adjustable. The angularly and vertically-adjustable mounting systems and components can then be used to mount panels in a wide range of design spaces, almost regardless of dimensional variations and surface mounting features.

For example, a mounting member in accordance with at least one implementation of the present invention for mounting one or more panels to any of a partition, display, treatment, or barrier, can include an elongate support member. The mounting member can also include a first mounting plate adapted to secure a first end of the elongate support member to a first mounting surface. In addition, the mounting member can include an angularly-adjustable mounting plate adapted to secure an opposing second end of the elongate support member to a plurality of mounting surface angles, while also securing the elongate support member in a substantially-vertical orientation. Furthermore, the mounting member can include at least one mounting channel formed in the elongate support member adapted to receive at least one panel.

In addition, a system for mounting a plurality of panels differentially between a plurality of opposing surfaces, can include a plurality of elongate support members aligned in a substantially-vertical orientation between a corresponding plurality of opposed support and upper surfaces. The system can also include a first mounting plate used to secure each first end of each elongate support member to a support surface. In addition, the system can include an angularly-adjustable mounting plate that secures each second end of each elongate support member to an opposed upper surface. In this case, each of the elongate support members is individually adjusted in height and angle between the opposed support and upper surfaces. Furthermore, the system can include a plurality of panels secured by the plurality of elongate support members.

A method of securely assembling a partition, display, treatment, or barrier between the opposing mounting surfaces, can involve securing a first end of an elongate mounting member to a first mounting surface via a first mounting plate. The method can also involve adjusting an angle of an angularly-adjustable mounting plate mounted to the elongate mounting member. The angularly-adjustable mounting plate is essentially flush with an angled mounting surface opposed to the first mounting surface. In addition, the method can involve securing a second end of the elongate mounting member to the angled mounting surface via the angularly-adjustable mounting plate. The elongate mounting member is secured in a substantially-vertical orientation. Furthermore, the method can involve mounting at least one panel to the elongate mounting member.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 illustrates a mounted panel and an exploded view of specific components used to mount the panels in accordance with an implementation of the present invention. To create this assembly, the manufacturer/assembler can assemble panels 102 between uprights (i.e., elongate support members 10). To do so, the manufacturer/assembler might start with one upright and secure side brackets 104 into position in the mounting channel 12 (FIG. 2) with the drop-in t-nuts 106. In particular, the manufacturer/assembler can drop a t-nut 106 into the mounting channel 12, slide a mounting protrusion 84 of the side bracket 104 into the mounting channel 12, and fasten the side bracket 104 to the t-nut 106. The manufacturer/assembler might then secure the other brackets on the desired number of uprights for the solution. The manufacturer/assembler can secure acute-angle brackets 70, Y brackets 76, or brackets 65 to elongate support members 10 using t-nuts 106 in a similar manner.

DETAILED DESCRIPTION OF THE PREFERRED EMBODIMENTS

The present invention extends to systems, methods, and apparatus for mounting panels as partitions, displays, barriers, or treatments with a great deal of versatility, almost regardless of the dimensions of any given design space. In particular, implementations of the present invention provide mounting apparatus that can be used in a wide variety of configurations, and secured to a wide variety of surfaces including non-standard mounting surfaces. In one implementation, for example, implementations of the present invention include panel mounting systems and components that are angularly and/or vertically-adjustable. The angularly and vertically-adjustable mounting systems and components can then be used to mount panels in a wide range of design spaces, almost regardless of dimensional variations and surface mounting features.

As will be appreciated more fully herein, these components, when coupled or mounted with one or more panels, can provide the ability to mount the panels to both non-standard mounting surfaces oriented at any of a plurality of angles. Implementations of the present invention also include a number of components that can be used to mount panels between opposing surfaces separated by plurality of distances. Accordingly, at least one advantage of the present invention is it that assemblers of panels can mount panels as partitions, barriers, or treatments, etc. in virtually any support structures without necessarily needing to have a complete knowledge of the various dimensional details of their space.

Figure 1:
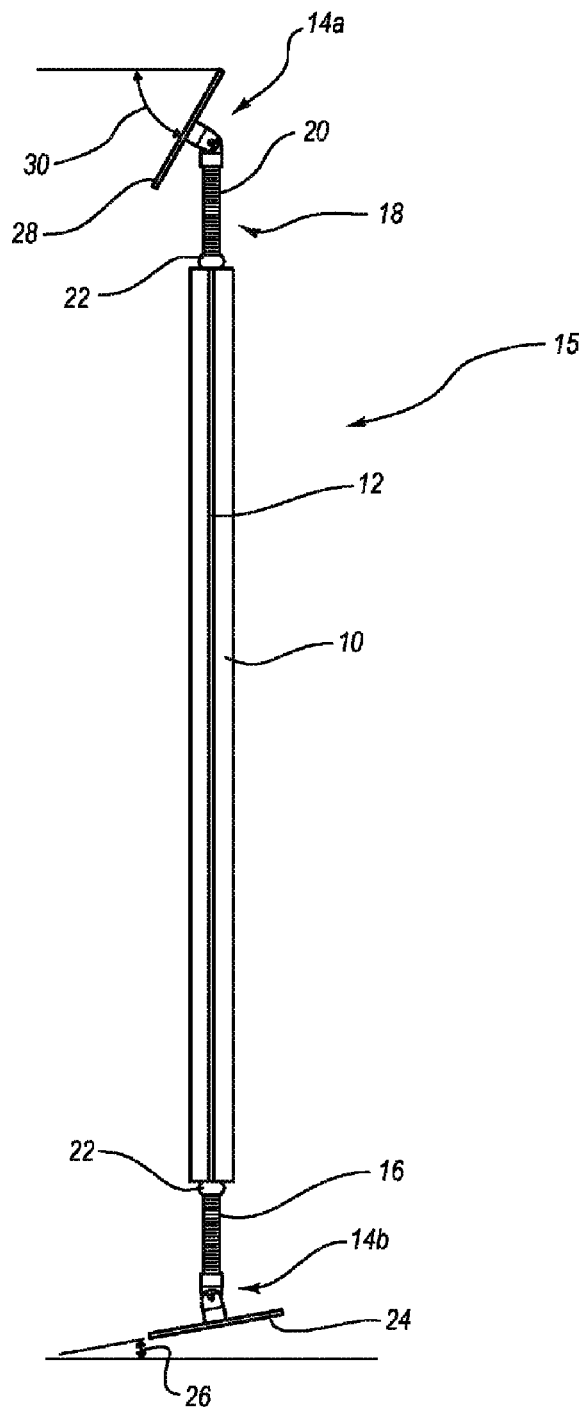
FIG. 1 illustrates an angularly and vertically-adjustable panel mounting member in accordance with an implementation of the present invention.

FIG. 1 illustrates an implementation of a variable-angle panel mounting member 15 adapted to be secured between an upper interface, such as a ceiling, and a support surface, such as a floor, via opposing mounting surfaces 24, 28. In general, FIG. 1 illustrates that the variable-angle panel mounting member 15 comprises an elongate support member 10 with a variable-angle mounting plates 14*a*, 14*b* secured to opposing ends thereof. In addition, FIG. 1 shows that the elongate support member 10 includes a mounting channel 12, which can be used to secure one or more panels. As used herein, the term "panel" refers primarily to resin-based panels, such as panels comprising polycarbonates, copolyesters, acrylics, or mixtures thereof, and also to non-resin based panels, such as those based partly or entirely from glass or glass composites.

Figure 2:
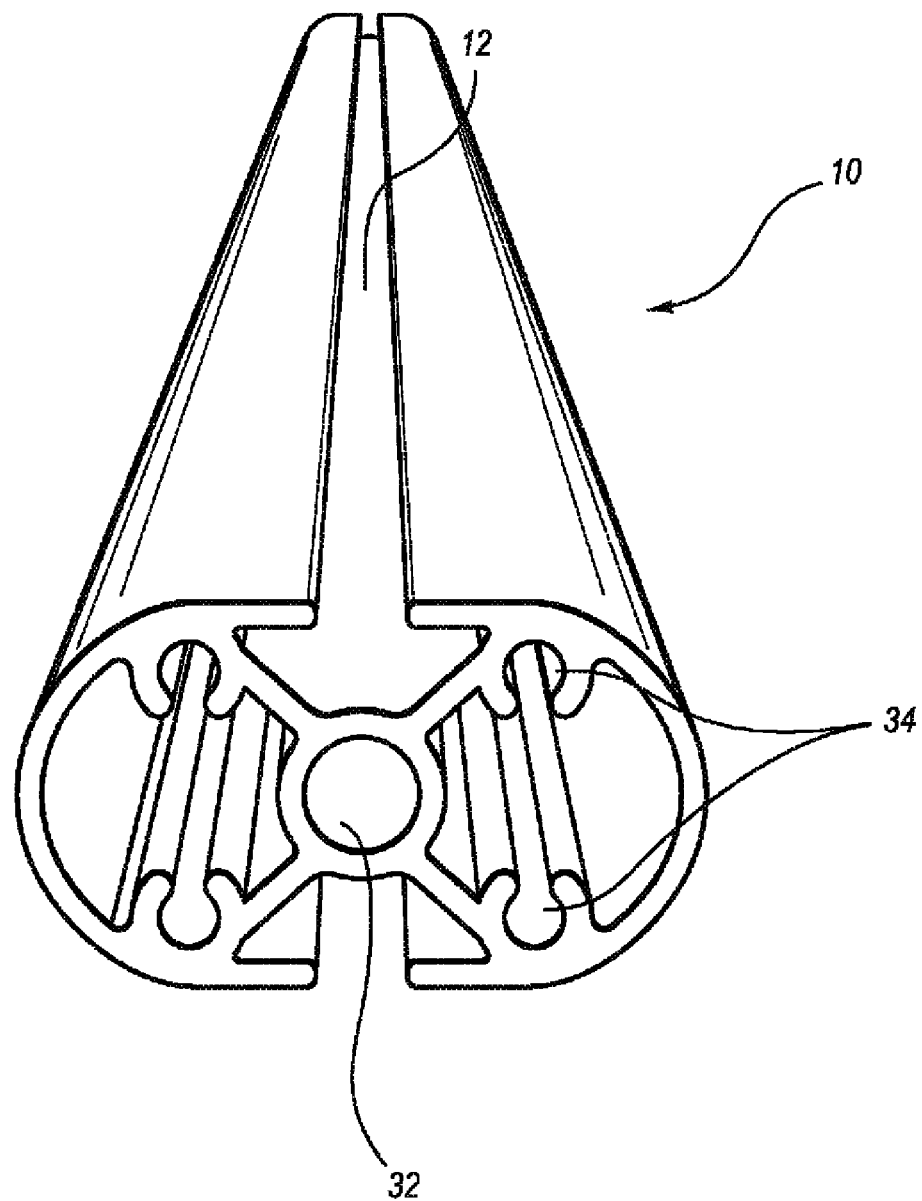
FIG. 2 illustrates a top perspective view of an elongate support member used in the panel mounting member of FIG. 1.
Figure 3:
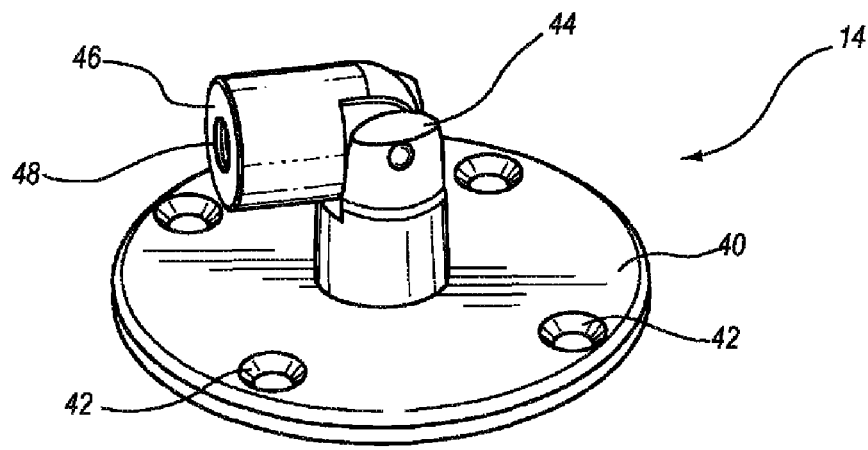
FIG. 3 illustrates a perspective view of an angularly-adjustable mounting plate in accordance with an implementation of the present invention.
Figure 4:
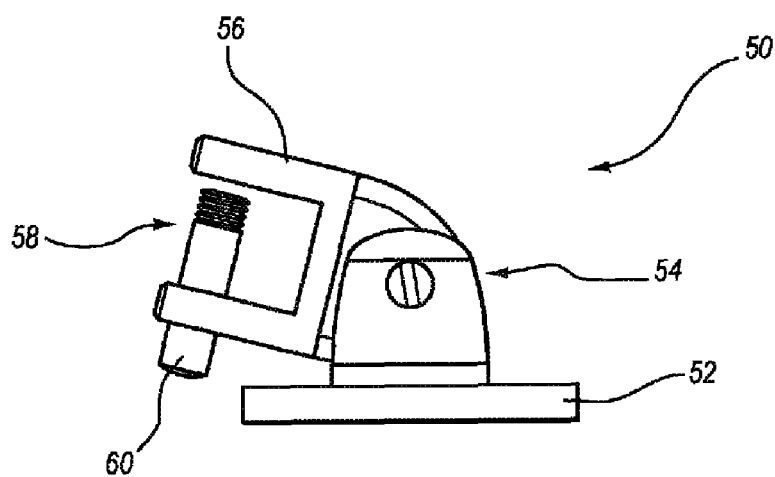
FIG. 4 illustrates a side view of another angularly-adjustable mounting plate in accordance with an implementation of the present invention.

FIGS. 2-4, and the corresponding text, illustrate or describe a number of different additional details and features/uses of the mounting member 15 shown in FIG. 1. For example, FIG. 2 illustrates a top perspective view of the elongate support member 10. As a preliminary matter, one will appreciate that the elongate support member 10 may be formed from extruded aluminum. Of course, the elongate support member 10 may be formed from any suitable material that is both light weight and strong, and provides an appropriate aesthetic.

FIG. 2 illustrates at least one implementation in which the elongate support member 10 can have an oval cross-section when viewed from the top. Of course, other cross-sectional shapes are also possible, including primarily circular, square, rectangular, or even more-complex shapes. In addition, FIG. 2 shows that the elongate support member 10 may include two mounting channels 12 extending into each major surface. Each mounting channel 12, in turn, may be configured to receive a panel directly, or otherwise receive a panel mounting bracket, such as the brackets 70 and 76 described herein with reference to FIGS. 7 and 8. In addition, FIG. 2 shows that the elongate support member 10 may include a center through-hole 32 and threaded receivers 34 configured to received fasteners.

Referring again to FIG. 1, each of the variable-angle mounting plates 14a, 14b can be secured to the through-hole 32 of the elongate support member 10 via threaded-rods 16, 20. The variable-angle panel mounting member 15 is adapted to be mounted to at least one non-standard mounting surface or interface. As used herein, "non-standard mounting surface" means a surface that is not substantially horizontal or vertical such as, for example, angled and uneven floor surfaces, and arched, curved, and angled walls and ceiling surfaces.

Each variable-angle mounting plate 14 of the variable-angle panel mounting member 15 is configured to be adjustable in order to be mounted to one or more of a plurality of angles and orientations in the various surfaces. As illustrated in FIG. 1, for example, the variable-angle panel mounting member 15 is secured between two non-standard mounting surfaces 24, 28. In other implementations, however, one or both of the surfaces to which the variable-angle panel mounting member 15 can be mounted can be "standard," i.e., substantially-vertical or substantially horizontal.

FIG. 3 illustrates a perspective view of a variable-angle mounting plate 14. In general, as illustrated in FIG. 3, each variable-angle mounting plate 14 includes a base 40 adapted to be secured to a mounting surface (ceiling, wall, or floor) via one or more fasteners, which can be secured via holes 42. Each variable-angle mounting plate 14 can also include a female connection member 46 pivotally secured to the base 40 via a pivot member 44. The pivot member 44 allows the female connection member 46 to pivot through at least a 180 degree range with respect to the base 40. Furthermore, in some embodiments the pivot 44 may be configured to swivel through a 360 degree range with respect to the base 40. The female connection member 46 can also include a threaded through-hole 48 for receiving a threaded-rod (e.g., 20). Also, while not shown, the female connection member can include a set screw—or means of locking or fixing—a threaded-rod within the threaded through-hole 48.

FIG. 4 illustrates a side-view of another embodiment of a variable-angle mounting plate 50. Similar to the variable-angle mounting plate 14 illustrated in FIG. 3, the variable-angle mounting plate 50 can also include a base 52, which is configured to be secured to a mounting surface, and a female connection member 56 secured to the base 52 via a pivot 54. Furthermore, in some embodiments the pivot 54 may be configured to swivel through a 360 degree range with respect to the base 52. As shown in FIG. 4, however, the female connection member 56 can include a receiving portion 58 configured to directly receive and secure a panel therein. The variable-angle mounting plate 50 can also include a set screw 60 configured to secure a panel within the receiving portion 58.

As shown in FIG. 1, therefore, the base 40 of the top variable-angle mounting plate 14a is secured to the mounting surface 28, which can be oriented at an angle 30 from the horizontal. The pivot 44 allows the variable-angle mounting plate 14 to be mounted to the angled surface 28, and still hold the threaded-rod 20, and in turn the elongate support member 10, in a vertical orientation. Thus, the variable-angle mounting plates 14a, 14b allow the variable-angle panel mounting member 15 to be secured in a vertical orientation between two opposing surfaces, regardless of whether the surfaces are standard or non-standard mounting surfaces. Thus, as shown in FIG. 1, the variable-angle panel mounting member 15 can be mounted between an uneven floor surface 24 offset from the horizontal by angle 26 and the ceiling surface 28 offset from the horizontal by angle 30.

The variable-angle panel mounting member 15, illustrated in FIG. 1, can also be adapted to be secured between opposing surfaces spaced apart by a range of distances. In particular, the variable-angle panel mounting member 15 can include a height-adjustable mounting system 18, which can be vertically adjusted via one or more pressure fit assemblies (e.g., a "pressure fit mounting system"). Along these lines, FIG. 1 shows that a pressure-fit mounting system 18 can include a threaded-rod 20 secured to, for example, a variable-angle mounting plate 14 on one end, and the through-hole 32 of the elongate support member 10. The pressure-fit mounting system 18 can also include a barrel nut 22, which can be threaded on to the threaded-rod 20 (and can be positioned inside or outside the support member 10). A manufacturer can also use barrel nut 22 with threaded-rod 16 to prevent the threaded rod 20 from slipping up into the elongate support member.

Once threaded to the threaded-rod 20, the barrel nut 22 can be translated by rotation towards the elongate support member 10 which causes the variable-angle mounting plate 14, secured to the distal end of the threaded-rod 20, to be moved vertically toward the mounting surface 28. Thus, an assembler can manipulate the pressure-fit mounting system 18 to move the variable-angle mounting plate 14 vertically toward the mounting surface 28 until the variable-angle panel mounting member 15 is in tension between opposing mounting surfaces 24, 28. Of course, one will appreciate that the manufacturer/assembler can also include a pressure-fit mounting system 18 on both top and bottom portions of the elongate support member 10, as needed. In such a case, the assembler could thus adjust both top and bottom portions through rotational motion as described above.

In at least one implementation, the pressure-fit mounting system 18 has adjustable range of from about three inches (3") to about feet (3'). In additional or alternative implementations, the adjustability range of the pressure-fit mounting system 18 can be approximately one and a half feet (1.5°). The pressure-fit mounting system 18 thus allows the variable-angle panel mounting member 15 to be mounted between opposing surfaces offset by a wide range of distances.

While the embodiment of the pressure-fit mounting system 18 shown in FIG. 1 incorporates a threaded-rod 20 and a barrel nut 22, in other embodiments not shown, the pressure-fit mounting system 18 can comprise other mechanisms that can allow the variable-angle mounting plate 14 to be vertically adjustable with respect to the elongate support member 10. For example, in some embodiments, the pressure-fit mounting system 18 can comprise a spring-loaded assembly (not shown) that is secured to the top of the elongate support member 10. In such an embodiment, the spring-loaded assembly biases the variable-angle mounting plate 14 between the elongate support member 10 and the support surface 28.

In yet further embodiments, the pressure-fit mounting system 18 can comprise an extrusion into which the elongate support member 10 can telescopically fit. In such an embodiment, the extrusion can slide up from the elongate support member 10 until a variable-angle mounting plate 14 that is attached to a distal end thereof reaches the mounting surface 28. The extrusion can then be locked in relation to the elongate support member 10 by a fastener, set screw, or other locking means.

Figure 5:
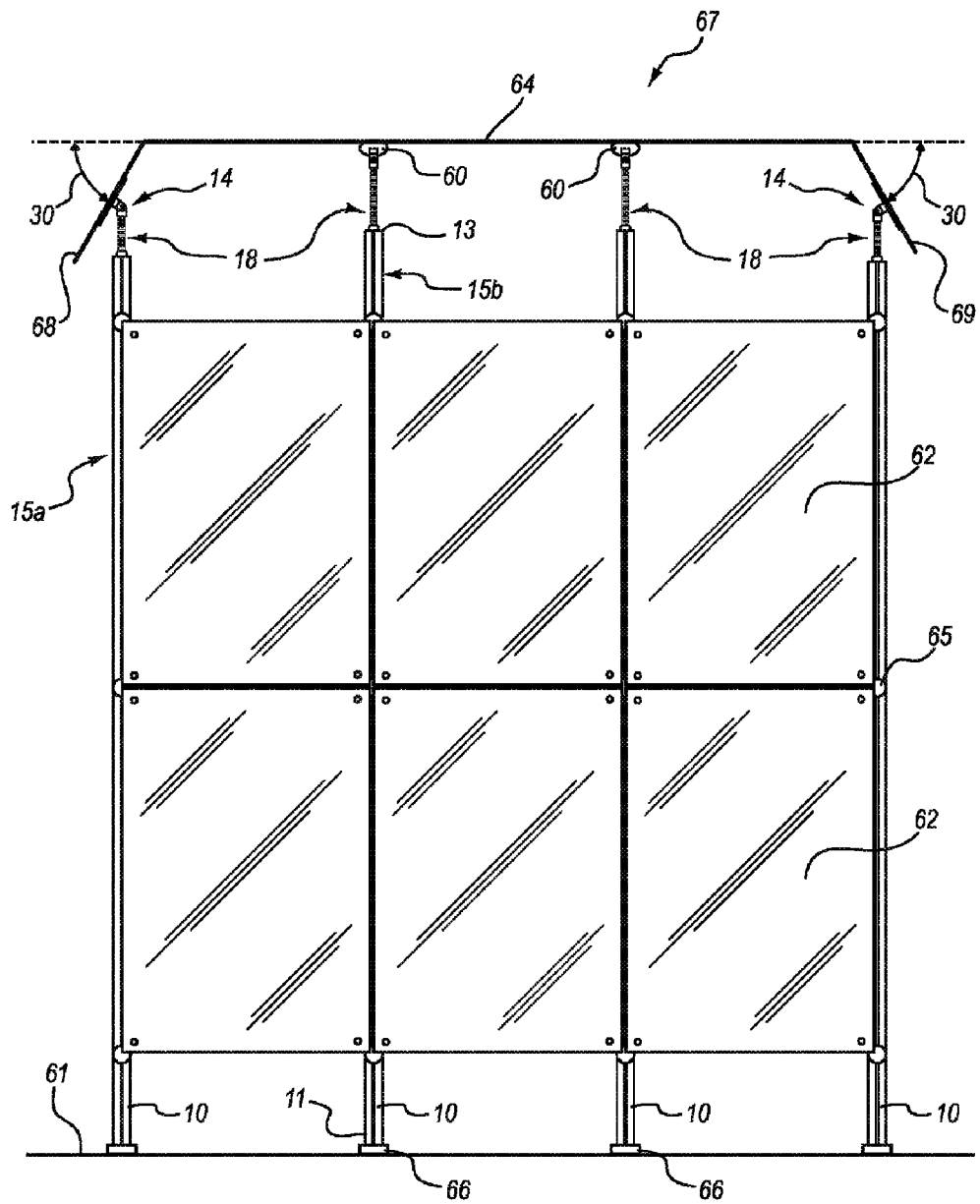
FIG. 5 illustrates a schematic diagram in accordance with one or more implementations of the present invention in which a plurality of panels are mounted as a partition to both standard and non-standard mounting surfaces.

FIG. 5 illustrates a schematic diagram of a system 67 comprising plurality of panels 62 that are mounted as a partition, and secured in two instances to non-standard mounting surfaces 68, 69. As shown, the system 67 system can be configured for mounting the plurality of panels differentially between a plurality of opposing surfaces 61, 64, 68, 69. In other words the system 67 can be configured to mount a plurality of variable-angle panel mounting members between opposing surfaces, where each variable-angle panel mounting member can each be adjusted to a different vertical height using or angle using a pressure-fit mounting system or a variable-angle mounting plate in order to be securely fixed between varying opposing surfaces.

As shown in FIG. 5, for example, the system 67 can include a plurality of elongate support members 10 aligned in a substantially-vertical orientation between a corresponding plurality of opposed support 61 and upper surfaces 64, 68, 69. As shown in FIG. 5, bottom mounting plates 66 can secure each first end 11 of each elongate support member 10 to the support surface 61. In this example, each bottom mounting plate 66 comprises a base configured to be secured by fasteners to both the threaded receivers 34 of the elongate support member 10 and to the support surface 61. Furthermore, in this particular illustration, the entire support surface 61 is a standard mounting surface. Of course, one will appreciate that if the support surface 61 varied and comprised non-standard mounting surfaces, such as the support surface 24 shown in FIG. 1, an assembler could alternatively use variable-angle mounting plates (e.g., FIG. 3 or 4) in place of the bottom mounting plates 66.

Similarly, top mounting plates 60 can be used to secure each second end 13 of each elongate support member 10 to the standard upper mounting surface 64. Each top mounting plate 60 can be configured to be secured to the upper mounting surface 64 via fasteners and to each elongate support member 10 by means of a pressure-fit mounting system 18. For example, FIG. 5 shows that one elongate mounting member 15*a* is configured to be secured to an angled (or non-standard) mounting surface 68, while another elongate mounting member 15*b* is configured to be secured to a standard mounting surface 64.

As such, FIG. 5 also shows that the system 67 can also include variable angle mounting plates 14 (with member 15*a*) securing each second end of each elongate support member 10 to any non-standard upper surfaces 68, 69. Thus, each of the elongate support members 10 can be individually adjusted in height and angle between the opposed support 61 and upper surfaces 64, 68, 69. Furthermore, a plurality of panels 62 can be secured between the plurality of elongate support members 10. As shown in FIG. 5, the plurality of panels 62 can be secured to the plurality of elongate support members via a plurality of spider brackets 65. In additional embodiments, the plurality of panels 62 can be secured to the plurality of elongate support members via Y and or acute-angle brackets, as described more fully below (e.g., FIGS. 7, 8).

Figure 6:
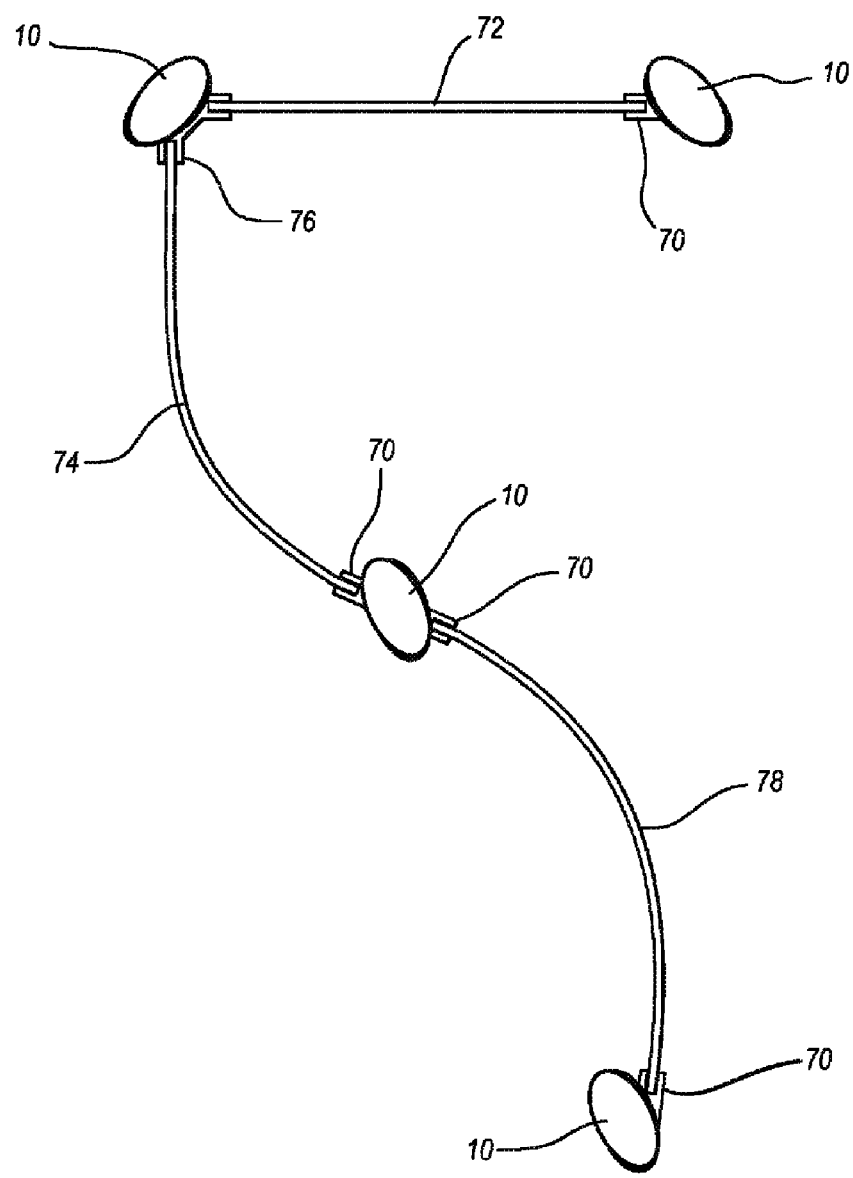
FIG. 6 illustrates a schematic diagram of a top view of a plurality of panels mounted between elongate support members configured using one or more components in accordance with one or more implementations of the present invention.

The present invention also contemplates mounting panels in a wide variety of linear and non-linear configurations. For example, FIG. 6 illustrates a schematic diagram of a top view of a plurality of panels 72, 74, 78 mounted between elongate support members 10. The elongate support members 10, in these cases, are configured using one or more brackets that allow an angled or even curved assembly. In general, these assemblies can be accomplished using the elongate support members described herein in conjunction with one or more Y brackets 76 and/or acute angle brackets 70. As discussed more fully below, these Y and/or acute angle brackets allow the panels to be oriented at varying angles with respect to the elongate support members 10.

Figure 7:
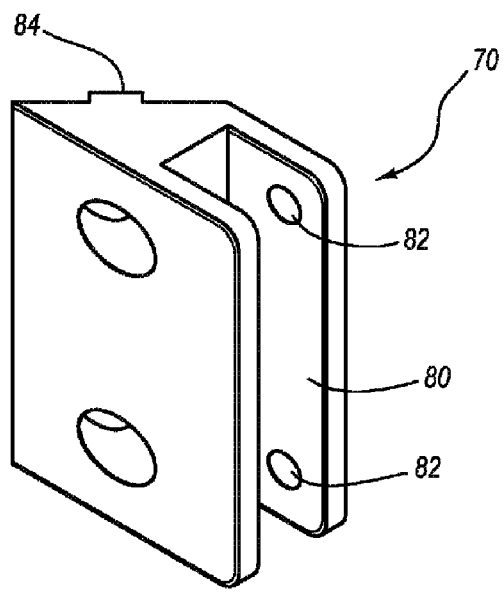
FIG. 7 illustrates a perspective view an acute-angle bracket in accordance with an implementation of the present invention.

For example, FIG. 7 illustrates a perspective view of an acute-angle bracket 70. The acute-angle bracket 70 can include a mounting protrusion 84 configured to be secured (e.g., slid into and fastened) within a mounting channel 12 of an elongate support member 10. The acute-angle bracket 70 can also include a receiving portion 80 configured to receive an edge of a panel therein. For example, FIG. 7 shows that the acute-angle bracket 70 can also include fastening holes 82 via which the panel can be secured to the acute-angle bracket 70.

FIG. 7 further shows that the receiving portion 80 can be oriented at an angle with respect to the mounting protrusion 84. This allows the acute-angle bracket 70 to mount a panel at an orientation extending at an acute angle relative to a minor axis of an elongate support member 10 as shown in FIG. 6. The ability to mount a panel at an orientation extending at an acute angle relative to a minor axis of an elongate support member 10 allows curved panels 74, 78 to be secured between elongate support members 10 as shown in FIG. 6.

Figure 8:
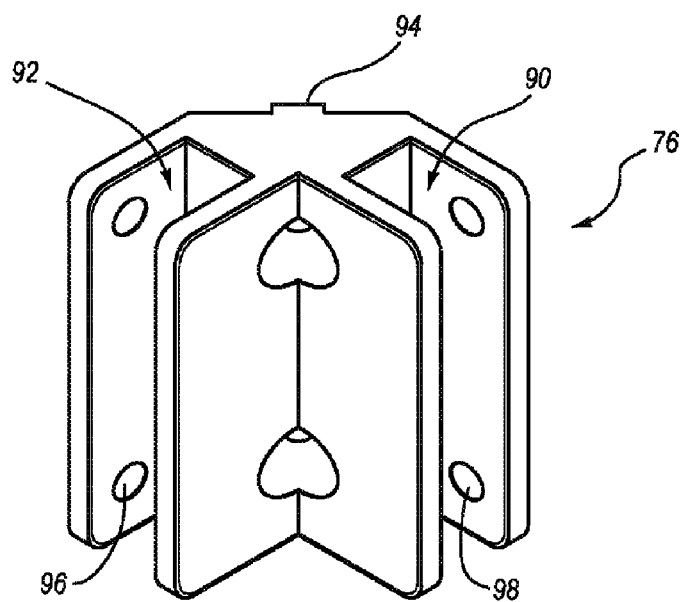
FIG. 8 illustrates a perspective view of a Y bracket in accordance with an implementation of the present invention.
Figure 9:
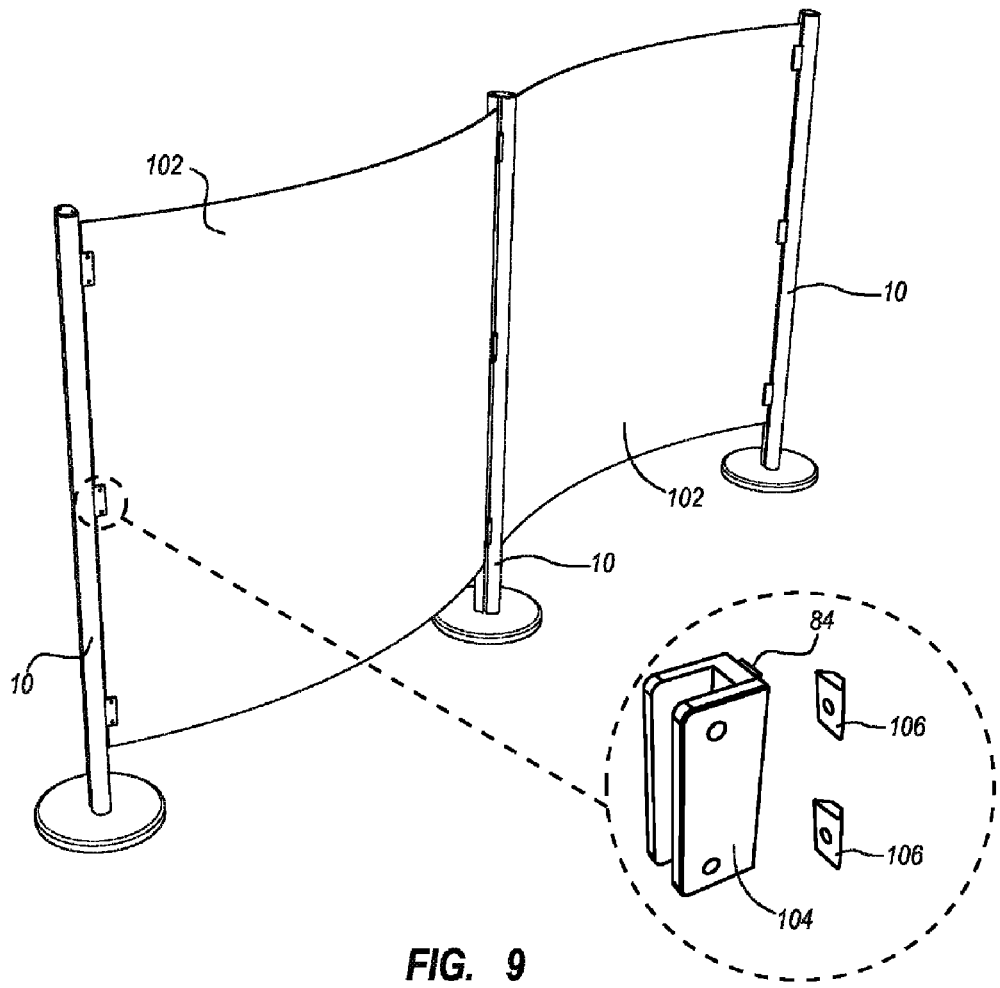
FIG. 9 illustrates a mounted panel and an exploded view of specific components used to mount the panels in accordance with an implementation of the present invention.

FIG. 8 illustrates a perspective view of a Y bracket 76. The Y bracket 76 can include a mounting protrusion 94, similar to the mounting protrusion 84 described above in relation to the acute-angle bracket 70. As with protrusion 84, the mounting protrusion 94 can be configured to be secured within a mounting channel 12 of an elongate support member 10. The Y bracket 76 can also include two receiving portions 90, 92, each configured to receive and secure an edge of a panel therein. In one implementation, the receiving portion 90 is orthogonally oriented with respect to the receiving portion 92. The orientation of the receiving portions 90, 92 thus enable the Y bracket 76 to secure a first panel 72 to the elongate support member 10 in an orientation extending at an acute angle relative to a minor axis of the elongate support member 10, and secure a second panel 74 to the elongate support member 10 in an orientation substantially orthogonal to the first panel 72 as shown in FIG. 6.

Thus, one will appreciate that the acute-angle bracket 70 and the Y bracket 76 allow panels to be mounted to elongate support members 10 in a wide variety of orientations. Furthermore, the Y bracket allows more than one panel to be secured to the same elongate support member 10, thus reducing the number of elongate support members 10 need to arrange panels in complex configurations. Furthermore, more than one Y bracket 76 can be mounted to a single elongate support member 10. For example, two Y brackets 76 can be secured into an oval, elongate support member, and four Y brackets 76 can be secured to a square, elongate support member.

The present invention also includes methods of assembling and securing panels as a partition, display, treatment, or barrier between the opposing mounting surfaces. The following describe at least one implementation of a method of mounting the variable-angle panel mounting members 15a and 15b shown in FIG. 5 with panels therebetween. Of course, as a preliminary matter, one of ordinary skill in the art will recognize that the methods explained in detail can be modified to install a wide variety of configuration to a wide variety of standard and non-standard opposing surfaces spaced apart at varying distances using one or more components of the present invention.

According to one method of the present invention, for example, at least one panel 62 can be secured either directly, or via brackets 65, to the mounting channels 12 of opposing elongate support members 10 of variable-angle panel mounting members 15a, 15b. After assembling the panels 62 to the elongate support members 10, a manufacturer/assembler can then attach bottom mounting plates 66 to the elongate support members 10. The manufacturer/assembler can then secure variable-angle mounting plate 14 to the elongate support member 10 of variable-angle panel mounting member 15a, and further secure the top mounting plate 66 to the elongate support member 10 of variable-angle panel mounting member 15b using pressure-fit assemblies 18.

To do so in at least one implementation, the manufacturer can insert a threaded-rod 20 into the female connection member 46 of the variable-angle mounting plate 14 on one end, and into the top mounting plate 60 on the other end, and secure the threaded-rods 20 with a set screw, as desired. The manufacturer can then thread barrel nuts 22 and lock nuts (not shown) on to the threaded-rods 20. In general, the manufacturer/assembler will want to ensure that the lock nuts are above, or closer to the variable-angle mounting plate 14 (and the top mounting plate 60) than to the barrel nuts 22.

Having assembled the partition, the manufacturer can then lift the assembly upright, and insert the threaded-rods 20 of the pressure-fit mounting systems 18 into the center throughholes 32 of the elongate support members 10. The manufacturer can then move the partition into place. Thereafter, the manufacturer can thread the barrel nuts 22 towards the elongate support members 10, pushing the variable-angle mounting plate 14 and the top mounting plate 60 towards the upper surfaces 68, 64. When the base 40 of the variable-angle mounting plate 14 reaches the upper surface 68, the pivot 44 can be adjusted to align the base 40 with the upper surface 68, so they are essentially flush. This also ensures that the elongate support member 10 is in a vertical orientation. When the partition is in place, the manufacturer can thread the lock nuts tight against the barrel nuts 22, which secures them together in place. The manufacturer can then bolt the bottom mounting plates 66 securely to the support surfaces 61, the variable-angle mounting plate 14 to the upper surface 68, and the upper mounting plate 60 to the upper standard surface 68 with screws or other fasteners.

Accordingly, the various features and components of the present invention allow panels to be mounted between a wide variety of opposing support surfaces, whether standard or non-standard, and whether spaced at a single distance or varying distances. Thus, the various features and components of the present invention provide great flexibility in terms of mounting style or arrangement. That is, they can be erected in any number of configurations, almost regardless of dimensional characteristics of the design space. This is possible at least in part since the mounting systems of the present invention do not require complicated hardware and installation processes (thus they can be readily assembled and disassembled). This is also at least in part since support members can be easily modified to securely mount to almost any spacing between a ceiling and floor (or other similar opposed support structures), and since the mounting surfaces/interfaces can be angled to almost any suitable angle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A panel mounting system to which a plurality of panels are mounted, the panel mounting system comprising:
   plurality of elongate support members each including an elongated mounting channel;
   one or more panel mounting brackets adapted to be secured to an elongate support member at the elongated mounting channel thereof, each panel mounting bracket comprising,
      an essentially flat back plate having a mounting protrusion extending outwardly from the back plate, the mounting protrusion being adapted to slide in a longitudinal manner into the elongated mounting channel to secure the mounting plate to an elongate support member; and
      one or more receiving portions joined to the back plate, each receiving portion comprising a channel between two side members, the channel being adapted to receive and secure an edge of a panel therein, and each receiving portion being joined to the back plate at an acute angle relative to the mounting protrusion so that a panel secured therein will extend from the elongate support member at said acute angle;
   a first mounting plate adapted to be secured to a first end of one or more of the elongate support members; and
   a second mounting plate adapted to be secured to an opposing second end of one or more of the elongate supports.

2. The panel mounting system as recited in claim 1, wherein the second mounting plate comprises an adjustable-angle mounting plate adapted to secure the opposing second end of the elongate support member to a plurality of mounting surface angles, and adapted to secure the elongate support member in a substantially-vertical orientation, the adjustable-angle mounting plate comprising:
   a base adapted to be secured to a mounting surface; and
   a female connection member pivotally secured to the base, wherein the female connection member is adapted to pivot through a range of at least 180 degrees with respect to the base.

3. The panel mounting system as recited in claim 2, further comprising a pressure-fit mounting assembly adapted to secure the second end of the elongate support member to the angularly-adjustable mounting plate via pressure between first and second mounting surfaces.

4. The panel mounting system as recited in claim 3, wherein the pressure-fit mounting assembly further comprises:
   a threaded-rod adapted to be inserted in a center throughhole of the elongate mounting member; and a barrel nut adapted to engage the threaded-rod and move the adjustable-angle mounting plate relative to the elongate support member by translating the treaded-rod in and out of the through-hole.

5. The panel mounting system as recited in claim 2, wherein the female connection member is adapted to receive one of a threaded-rod and a panel.

6. The panel mounting system as recited in claim 5, wherein the female connection member is adapted to swivel through a range of 360 degrees with respect to the base.

7. The panel mounting system as recited in claim 1, wherein:
the one or more panel mounting brackets include at least one Y bracket securable in the at least one mounting channel; and
wherein the at least one Y bracket is adapted to secure a first panel to the elongate support member in an orientation extending at an acute angle relative to mounting channel; and
the at least one Y bracket is adapted to secure a second panel to the elongate support member in an orientation substantially orthogonal to the first panel.

8. The panel mounting system as recited in claim 1, wherein the one or more panel mounting brackets include at least one acute-angle bracket securable into the least one mounting channel and adapted to secure a panel to the elongate mounting member in an orientation extending at an acute angle relative to a mounting channel.

9. A panel mounting system to which a plurality of panels is mounted in a manner so that at least some of the panels will form a partition or barrier having at least one portion thereof that is angled relative to another portion thereof, the panel mounting system comprising:
a plurality of elongate support members each including an elongated mounting channel;
one or more panel mounting brackets adapted to be secured to an elongate support member at the elongated mounting channel thereof, each panel mounting bracket comprising,
an essentially flat back plate having a mounting protrusion extending outwardly from the back plate, the mounting protrusion being adapted to slide in a longitudinal manner into the elongated mounting channel to secure the mounting plate to an elongate support member;
one or more receiving portions joined to the back plate, each receiving portion comprising a channel between two side members, the channel being adapted to receive and secure an edge of a panel therein, and each receiving portion being joined to the back plate at an acute angle relative to the mounting protrusion so that a panel secured therein will extend from the elongate support member at said acute angle; and
one or more openings formed through at least one or more side members of each receiving portion of each panel mounting plate and extending through said mounting protrusion, said one or more openings providing access through the panel mounting plate for securing the panel mounting plate within the elongated channel of the support member;
a first mounting plate coupled to a first end of each elongate support member;
a second mounting plate coupled to a second end of each elongate support member, at least one of the first and second mounting plates comprising an angularly-adjustable mounting plate; and
a panel secured to each of the first panel mounting bracket and the second panel mounting bracket and suspended between the first and second elongate support members.

10. The system as recited in claim 9, wherein each panel mounting bracket is secured at its mounting protrusion to a t-nut positioned within the elongated mounting channel of one of the plurality of elongate support members.

11. The system as recited in claim 9, wherein the elongate support members are mounted between first and second of the support surfaces and at least one of the first and second support surfaces is a non-standard mounting surface.

12. The system as recited in claim 10, further comprising:
a pressure-fit mounting assembly secured between the first end of the first elongate support member and the angularly-adjustable mounting plate;
wherein the pressure-fit mounting assembly is configured to individually adjust the first elongate support member in height.

13. The system as recited in claim 12, wherein the pressure-fit mounting assembly comprises:
a threaded-rod adapted to be inserted in a center through-hole of an elongate mounting member; and
a barrel nut adapted to engage the threaded-rod and move an adjustable-angle mounting plate relative to the elongate support member by translating the treaded rod in and out of the through-hole.

14. The system as recited in claim 9, wherein the panel comprises a decorative panel formed from resin, polycarbonate, or glass.

15. The system as recited in claim 9, wherein the first panel mounting bracket comprises a Y or an acute-angle bracket.

\* \* \* \* \*

UNITED STATES PATENT AND TRADEMARK OFFICE
CERTIFICATE OF CORRECTION

PATENT NO. : 8,167,152 B1
APPLICATION NO. : 12/028584
DATED : May 1, 2012
INVENTOR(S) : Gatti et al.

It is certified that error appears in the above-identified patent and that said Letters Patent is hereby corrected as shown below:

In the Specifications:

Column 1
Line 39, change "glass" to --glass,--

Column 2
Line 5-6, change "substantially-vertical" to --substantially vertical--
Line 39, change "surfaces" to --surfaces,--

Column 5
Line 14-15, change "light weight" to --lightweight--

Column 6
Line 64, change "about feet" to --about three feet--
Line 66, change "(1.5°)" to --(1.5')--

Column 7
Line 26, change "comprising plurality" to --comprising a plurality--
Line 31, change "other words" to --other words,--
Line 34-35, change "height using or angle using" to --height or angle using--
Line 39-40, change "substantially-vertical" to --substantially vertical--

Column 8
Line 39, change "support member 10" to --support member 10,--
Line 43, change "support members 10" to --support members 10,--
Line 60, change "first panel 72" to --first panel 72,--

Signed and Sealed this
Twenty-third Day of April, 2013

Teresa Stanek Rea
*Acting Director of the United States Patent and Trademark Office*

CERTIFICATE OF CORRECTION (continued)
U.S. Pat. No. 8,167,152 B1

In the Claims:

Column 11
Line 3, change "treaded-rod" to --threaded-rod--
Line 25, change "the least one" to --the at least one--

Column 12
Line 26, change "second of the" to --second--
Line 32, change "plate;" to --plate; and--
Line 42, change "treaded rod" to --threaded-rod--